(12) United States Patent
Hefeeda et al.

(10) Patent No.: US 10,834,379 B2
(45) Date of Patent: *Nov. 10, 2020

(54) 2D-TO-3D VIDEO FRAME CONVERSION

(71) Applicants: Mohamed M. Hefeeda, Doha (QA); Kiana Ali Asghar Calagari, Doha (QA); Mohamed Abdelaziz A Mohamed Elgharib, Doha (QA); Wojciech Matusik, Doha (QA); Piotr Didyk, Doha (QA); Alexandre Kaspar, Doha (QA)

(72) Inventors: Mohamed M. Hefeeda, Doha (QA); Kiana Ali Asghar Calagari, Doha (QA); Mohamed Abdelaziz A Mohamed Elgharib, Doha (QA); Wojciech Matusik, Doha (QA); Piotr Didyk, Doha (QA); Alexandre Kaspar, Doha (QA)

(73) Assignees: Mohamed M. Hefeeda, Doha (QA); Kiana Ali Asghar Calagari, Doha (QA); Mohamed Abdelaziz A Mohamed Elgharib, Doha (QA); Wojciech Matusik, Doha (QA); Piotr Didyk, Doha (QA); Alexandre Kaspar, Doha (QA)

( * ) Notice: Subject to any disclaimer, the term of this patent is extended or adjusted under 35 U.S.C. 154(b) by 0 days.

This patent is subject to a terminal disclaimer.

(21) Appl. No.: 16/578,420

(22) Filed: Sep. 23, 2019

(65) Prior Publication Data

US 2020/0053345 A1 Feb. 13, 2020

Related U.S. Application Data

(62) Division of application No. 15/749,509, filed as application No. PCT/GB2016/052388 on Aug. 3, 2016, now Pat. No. 10,425,634.

(Continued)

(51) Int. Cl.
*H04N 13/268* (2018.01)
*G06F 16/738* (2019.01)
(Continued)

(52) U.S. Cl.
CPC ......... *H04N 13/268* (2018.05); *G06F 16/739* (2019.01); *G06T 7/11* (2017.01);
(Continued)

(58) Field of Classification Search
CPC ............... H04N 13/268; H04N 13/261; H04N 2013/0088; G06T 7/50; G06T 7/11;
(Continued)

(56) References Cited

U.S. PATENT DOCUMENTS

2010/0014781 A1* 1/2010 Liu ...................... H04N 13/261
382/285
2011/0141237 A1* 6/2011 Cheng ................. H04N 13/261
348/46

(Continued)

OTHER PUBLICATIONS

Pravin Bhat et al. "Fourier Analysis if the 2D Screened Poisson Equation for the Gradient Domain Problems", European Conference on Computer Vision 20008, pp. 114-118 (Year: 2008).*

*Primary Examiner* — Michael E Teitelbaum
(74) *Attorney, Agent, or Firm* — Soroker Agmon Nordman

(57) ABSTRACT

A wide spread adoption of 3D videos and technologies is hindered by the lack of high-quality 3D content. One promising solution to address this problem is to use automated 2D-to-3D conversion. However, current conversion methods, while general, produce low-quality results with artefacts that are not acceptable to many viewers. Creating a database of 3D stereoscopic videos with accurate depth is, however, very difficult. Computer generated content can be used to generate high-quality 3D video reference database for 2D-to-3D conversion. The method transfers depth infor- (Continued)

| 101 | Synthetic database (2D + Depth) | 105 | Block Matching | 110 | Object Masks |
| 102 | 2D Video | 106 | Gradient Extraction | 111 | Inferred Depth Gradients |
| 103 | Visual Search | 107 | Matched Image | 112 | Poisson Reconstruction |
| 104 | 2D + Depth Candidate | 104 | Gx, Gy | 112A | Objects boundary cut |
| 104A | 2D Candidate | 109 | Gradient Mapping and Refinement | 112B | Smoothing |
| 104B | Depth Candidate | | | 113 | 2D + Depth Output | mation from frames in the 3D reference database to the target frame while respecting object boundaries. It computes depth maps from the depth gradients, and outputs a stereoscopic video.

14 Claims, 10 Drawing Sheets

Related U.S. Application Data

(60) Provisional application No. 62/200,311, filed on Aug. 3, 2015.

(51) Int. Cl.
*G06T 7/50* (2017.01)
*H04N 13/261* (2018.01)
*G06T 7/55* (2017.01)
*G06T 7/11* (2017.01)
*H04N 13/00* (2018.01)

(52) U.S. Cl.
CPC ................ *G06T 7/50* (2017.01); *G06T 7/55* (2017.01); *H04N 13/261* (2018.05); *G06T 2207/10016* (2013.01); *G06T 2207/20021* (2013.01); *H04N 2013/0088* (2013.01)

(58) Field of Classification Search
CPC ............. G06T 7/55; G06T 2207/10016; G06T 2207/20021; G06F 16/739
See application file for complete search history.

(56) References Cited

U.S. PATENT DOCUMENTS

| | | | |
|---|---|---|---|
| 2011/0150320 A1* | 6/2011 | Ramalingam | G01C 21/3602 382/154 |
| 2013/0106837 A1* | 5/2013 | Mukherjee | H04N 13/122 345/419 |
| 2014/0210944 A1* | 7/2014 | Jeong | H04N 13/264 348/43 |
| 2015/0023588 A1* | 1/2015 | Barone | G06T 7/593 382/154 |
| 2015/0178936 A1* | 6/2015 | Boisson | H04N 13/271 382/154 |

* cited by examiner

2D-TO-3D VIDEO FRAME CONVERSION

We present a data-driven technique for 2D-to-3D video conversion. Our technique is based on transferring depth gradients from a database of high quality synthetic images. Such images can be collected from video games, which are often available in a wide variety of genres i.e. sports and its sub-categories, actions and its sub-categories, normal graphics, etc. . . . . Using such synthetic images as the 2D+Depth repository eliminates the requirement of having expensive stereo cameras. This makes our technique more scalable to general data than state of the art. In addition, unlike previous data-driven techniques, our approach does not require global similarity between a query image and the database. Rather it only requires similarity on a local patch (portion). This substantially reduces the required 2D+Depth database size while maintaining similar depth quality. The result is easier scalability to more general data and easier adaption on consumer products.

INTRODUCTION

Stereoscopic 3D (S3D) movies are becoming popular with most of big productions being released in this format. However, in practice, most movies are shot in 2D and then they are up-converted to S3D by manually painting depth maps and rendering corresponding views. This process yields very good results but it is extremely costly and time-consuming. S3D production of live events is much harder. Manual up-conversion is not possible. Shooting live events, such as soccer games, directly in stereo requires placing multiple stereo rigs in the stadium. This is challenging and it is rarely being attempted. Therefore, a high-quality, automated 2D-to-3D conversion method is highly desired for live events. Current automated conversion methods are lacking. Most of the methods are general—they can be applied to any video stream.

However, the output is either marred with artefacts that are not acceptable to many viewers or the up-conversion method is extremely conservative—adding only very little depth to the resulting video.

We show how to develop high-quality automated 2D-to-3D conversion. Our approach is to develop a domain-specific up-conversion instead of a general method. In particular, we propose a method for generating S3D soccer video. Our method is data-driven, relying on a reference database of S3D videos. This is similar to previous work [13, 11]; however, our key insight is that instead of relying on depth data computed using computer vision methods or acquired by depth sensors, we can use computer generated depth from current computer sports games for creating a synthetic 3D database. Since the video quality of current computer games has come close to that of real videos, our approach offers two advantages: 1) we obtain a diverse database of video frames to facilitate good matching with input video frames; and 2) for each video frame, we obtain an accurate depth map with perfect depth discontinuities. Given a query image, we infer its depth based on similar images in the database and their depth maps. We propose to transfer the depth gradients (i.e., the rate of change in depth values along the x and y directions) from similar images in the synthetic 3D database to the query image. In one aspect of the invention we divide a query into blocks (portions) and transfer the depth gradients from matching blocks (portions) that may belong to different frames in the synthetic 3D database (reference database). This is quite different from previous approaches that use absolute depth over the whole frame [13, 11]. Our approach offers multiple advantages: (i) finer depth assignment to smaller regions/objects (e.g., players), (ii) much smaller database, as we match only small patches (portions) not whole frames (frames can have too many varieties), and (iii) more robustness to the (in)accuracy of similar images chosen as references, since we only use individual blocks (portions) in the depth calculation. After transferring the depth gradients, we recover the depth from these gradients by using Poisson reconstruction.

Poisson reconstruction is a robust technique traditionally used to recover an image from its gradient information by solving a Poisson equation [18, 7]. Preferably, to maintain clear player boundaries our method handles depth discontinuities by creating object masks and detecting object boundaries. We show the ability of handling a wide spectrum of soccer video shots, with different camera views, occlusion, close-ups, clutter and motion complexity.

We conduct extensive user studies with diverse video segments. We follow the ITU BT.2021 recommendations [6] in conducting these studies. The results show that: (i) our method produces 3D videos that are almost indistinguishable from videos originally shot in stereo, (ii) the perceived depth quality and visual comfort of videos produced by our method are rated Excellent by the subjects, most of the time, and (iii) our method significantly outperforms the state-of-the-art method [11].

PRIOR ART

Over the last few years, applications for 3D media have extended far beyond cinema and have become a significant interest to many researchers. Liu et al. [15] discuss 3D cinematography principles and their importance even for non-cinema 3D content. Wu et al. [23] adapt 3D content quality for tele-immersive applications in real-time. Calagari et al. [9] propose a 3D streaming system with depth customization for a wide variety of viewing displays. Yang et al. [24] prioritize 3D content streaming in a tele-immersive environment based on the client viewing angle. While such systems propose useful 3D applications, the limited 3D content remains a main bottleneck for 3D technology. To tackle this issue many researchers have explored 2D-to-3D conversion techniques. However, previous methods are either semi-automatic [19, 26] or cannot handle complex motions [12, 21, 13, 10, 11]. There has not been a 2D-to-3D conversion technique for soccer capable of handling complex motions with variety of scene structures, to the best of our knowledge.

In 2D-to-3D conversion, an image or a sequence of images is augmented with the corresponding depth maps. Using this information stereo image pairs can be synthesized. Depth maps can be computed using traditional computer vision approaches such as structure from motion or depth from defocus. Rzeszutek at al. [19] estimate the background depth based on motion. Zhang et al. [26] propose a semi-automatic 2D-to-3D conversion system based on multiple depth cues including motion and defocus. A survey on automatic 2D-to-3D conversion techniques and depth cues can be found in [25]. Furthermore, strong assumptions are often made on the depth distribution within a given scene. For example, Ko et al. [12] classify shots into long or non-long, where long shots are assumed to have a large field view and a depth ramp is assigned to the whole image, and players are assigned a constant depth. Similarly Schnyder et al. [21] detect players and assign constant depth to them. This, however, generates the well-known 'cardboard effect' where objects appear at when viewed in stereo.

Data-driven methods provide an alternative way of synthesizing depth maps and the corresponding stereo views. Hoiem et al. [10] segment a scene into planar regions, and assign an orientation to each region. This method provides a relatively coarse depth estimation. Konrad et al. [13] infer depth for an input image based on a database of image and depth map pairs. Their work is designed for still images and assumes that images with similar gradient-based features tend to have a similar depth. For a query image, the most similar images from the database are found. The query image depth is estimated as the median over depths of the retrieved images. Karsch et al. [11] extended this approach to image sequences. They also use a large database of image and depth map pairs. For a query frame, they find the most similar images in the database and then warp the retrieved images to the query image. Finally, the warped depth maps are combined to estimate the final depth. The work in [11] is the closest to ours and we compare against it.

There are a few commercial products that provide automated 2D-to-3D conversion, sold as stand-alone boxes (e.g., JVC's IF-2D3D1 Stereoscopic Image Processor, 3D Bee), or software packages (e.g., DDD's TriDef 3D). While the details of these systems are not known, their depth quality is still an outstanding issue [25].

The following prior art has been considered relevant to aspects of the invention and their main differences to certain aspects.

Patent Document No. US 2013/0147911 A1, Inventor: Karsch at al., Date: June 2013:

The method of US 2013/0147911 chooses the most similar images to the query frame from the database (candidates). Warps the candidates and fuses their depth to estimate the depth of the query. This method does not perform local search (block matching) and is not based on depth gradients, nor performs depth reconstruction based on gradients using the Poisson equation. The following aspects distinguish our method from this prior art work because we:

Use a synthetic 3D database (database of 2D images and depth information).

Preform local search (block matching) on the candidates: for each block in the query we search through all blocks (portions) in the candidate images to find the best matching block.

Copy the spatial gradients of the candidates' depths to the query, rather than the absolute depths.

Reconstruct the query depth map from its gradients using the Poisson equation.

Delineate object boundaries, and allow depth discontinuities by cutting the Poisson equation on the object boundaries.

Patent Document No. US 2015/0093017 A1, Inventor: Hefeeda et al., Date: April 2015:

US 2015/0093017 is a completely different system with different inputs and outputs. The main differences are:

The input is a 3D video (unlike our proposed system where the input is a 2D video), and the output is a unique signature for that video (unlike our proposed system where the output is the 3D version of that video).

In this system SIFT is used as a tool to match the pixels in the left and right views and measure their distance, while we use SIFT as a tool to search the database for the best matching block to each block in the query and copy its depth gradients.

Since the aim of this system is different, no depth maps are estimated and thus none of the following techniques are used: visual search, local search (block matching), gradient mapping, boundary cuts, and Poisson reconstruction.

Patent Document No. U.S. Pat. No. 8,953,905 B2, Inventor: Sandrew et al., Date: February 2015:

U.S. Pat. No. 8,953,905 B2 method is a semi-automatic method compared to our fully automated method. Aspects of this invention assume that "many movies now include computer-generated elements (also known as computer graphics or CG, or also as computer-generated imagery or CGI) that include objects that do not exist in reality, such as robots or spaceships for example, or which are added as effects to movies, for example dust, fog, clouds, etc." These objects are the only objects which depth is inferred for them automatically prior art recites: "Embodiments of the invention import any type of data file associated with a computer-generated element to provide instant depth values for a portion of an image associated with a computer-generated element." "All objects other than computer-generated objects are artistically depth adjusted." The main differences between this prior art and our approach are:

Unlike our method, this this prior art is unable to automatically infer depth of non-computer-generated objects from the database. Given that most scenes in sports videos are non-computer-generated, this invention is therefore not suitable for sports videos.

This prior art, in addition to the non-computer-generated objects, object masks for the key frames are also manually adjusted using interface tools, while in our method object boundaries are delineated automatically.

Visual search, local search (block matching), gradient mapping, and depth reconstruction from depth gradients are not used in this prior art while being the core parts of our approach.

Calagari, Kiana, et al. "Anahita: A System for 3D Video Streaming with Depth Customization." *Proceedings of the ACM International Conference on Multimedia*. ACM, 2014.

The goal and input/outputs of Calagari's system are completely different. The main differences are:

The main goal of this system is enhancing a 3D video, while the goal of our proposed system is generating a 3D video. The input in this system is a 3D video, while the input of our proposed system is a 2D video.

No 3D database is used.

This system does not include depth estimation since the video is already 3D. Thus none of the following techniques are used: visual search, local search (block matching), gradient mapping, boundary cuts, and Poisson reconstruction (depth reconstruction from depth gradients).

Corrigan, David, et al. "A video database for the development of stereo-3D post-production algorithms." *Visual Media Production (CVMP)*, 2010 Conference on. IEEE, 2010.

The aim of Corrigan's work is to provide a database of stereo-3D videos, which are representative examples of footage generated during a typical production to allow researchers to better understand the technical challenges involved in 3D post-production such as colour imbalances, stereo pair rectification, depth editing. The main differences with our method are:

This work only presents a 3D database not a conversion method.

This 3D database is aimed to enhance the quality of videos shot in 3D, while our method uses the database to convert a video shot in 2D to 3D.

Unlike our database, this database is not synthetic and thus high quality depth maps are not available.

Dominic, Jean Maria, and J. K. Arsha. "Automatic 2D-to-3D Image and Video Conversion by Learning Examples and Dual Edge-Confined Inpainting." *International Journal of Advanced Research in Computer Science and Software Engineering* (2014).

The main differences between Dominic's method and our technique are:
  The database used here is not synthetic.
  This method uses the absolute depth of the database images, instead of using depth gradients of the database images.
  After finding the image candidates, this method does not perform local search (block matching), gradient mapping, boundary cuts, or Poisson reconstruction (depth reconstruction from depth gradients); rather it simply uses the median of the candidate depth maps as the estimated depth for the query.

Kiana Calagari, "2D to 3D Conversion Using 3D Database For Football Scenes", July 2013.

Kiana is similar to the Dominic above, the main differences between the technique presented in Kiana and our technique are:
  The database used here is not synthetic. Also it is a not a depth gradient database but a 2D+depth image database.
  This method uses the absolute depth of the database images, instead of using depth gradients of the database images. The need to use depth gradients is proposed as an idea for future work but not described.
  After finding the image candidates, this method does not perform local search (block matching), gradient mapping, boundary cuts, nor Poisson reconstruction (depth reconstruction from depth gradients), rather it warps the candidates using SIFTflow and uses the median of the warped candidate depth maps as the estimated depth for the query. Note that SIFTflow is a warping method, which uses SIFT as an underlying tool, but in a different way and for a different purpose than we do. SIFTflow uses SIFT to warp an RGB image to another RGB image by moving each pixel based on a flow described by SIFT. We, however, use SIFT to find the best matching block for each block in the query and copy the gradients of its depth map to that block in the query.

Zhang, Chenxi, et al. "Personal photograph enhancement using internet photo collections." *Visualization and Computer Graphics, IEEE Transactions on* 20.2 (2014): 262-275.

Zhang, specifically focuses on images of major cities and tourist sites where a large number of photos of the exact same place are available over the Internet. They use this huge Internet Photo Collection (IPC) to perform many image enhancement techniques. One of these enhancements is converting the 2D image to 3D. The main differences between this work and our approach is as follows:
  In this work, they first perform foreground/background segmentation and use the IPC database only to assign depth to the background. The foreground depth is assigned manually. In our approach, however, both foreground and background depth is estimated automatically.
  Unlike our approach, this method requires the database to contain photos of the exact same place and cannot be performed using just visually similar images.

The background depth is estimated by generating a 3D model of the site using photos of the exact same site. Their 2D to 3D conversion technique does not include local search (block matching), gradient mapping, boundary cuts, or Poisson reconstruction (depth reconstruction from depth gradients). Poisson equation is used in their other photometric enhancement techniques (not 2D to 3D conversion) for reconstructing the image itself rather than its depth map.

The present invention and embodiments thereof seek to overcome or ameliorate difficulties faced in the prior art and provide alternate mechanisms for 2D to 3D conversion.

One aspect of the invention provides a method of processing 2D video images from a video stream for converting the 2D video images to 3D images, the method comprising:
  providing a reference database of video frames, each entry in the database comprising a 2D image and corresponding depth information for that 2D image;
  submitting input video frames to the reference database;
  matching an input video frame with a 2D image in the reference database and selecting the corresponding depth information for that 2D image; and
  applying the selected depth information to the matched input video frame to generate a 2D plus depth information frame.

Another aspect of the invention provides:
  dividing the input video frame into portions; and wherein matching the input video frame with a 2D image in the reference database comprises:
  matching a portion of the input video frame with a portion of that 2D image in the reference database.

In a further aspect of the invention, the portions are blocks of n×n pixels.

Another aspect of the invention further comprises matching another portion of the input video frame with a portion of another 2D image in the reference database so as to match multiple portions of the input video frame with respective portions of multiple 2D images.

A further aspect of the invention provides: applying the selected depth information to the matched input video frame comprises applying the depth information of the matched portion of the 2D image to the respective matched portion of the matched input video frame.

Another aspect of the invention provides: applying the selected depth information to the matched input video frame comprises mapping one or more corresponding pixels of the matched portion of the 2D image to the corresponding pixels of the matched portion of the input video frame.

A further aspect of the invention provides: identifying using a visual technique a candidate 2D image for matching with the input video frame.

In another aspect of the invention the visual technique comprises using GIST and colour information of the frames.

A further aspect of the invention provides: the depth information is a depth gradient.

Another aspect of the invention provides:
  identifying objects in the input video frame;
  determining object masks for the identified objects; and
  estimating the depth information using the determined object masks and the matched input video frame.

A further aspect of the invention provides: estimating the determined depth information using Poisson reconstruction.

In another aspect of the invention: the Poisson reconstruction comprises first order and higher derivatives.

A further aspect of the invention provides: generating a left stereo image and a right stereo image using the 2D plus depth information frame.

In another aspect of the invention: the reference database is populated using software generated video frames.

In a further aspect of the invention the software is a video game.

Another aspect of the invention provides a system to process 2D video images from a video stream for converting the 2D video images to 3D images, the system comprising:
a reference database of video frames, each entry in the database comprising a 2D image and corresponding depth information for that 2D image;
a search module operable to submit input video frames to the reference database;
a matching module operable to match an input video frame with a 2D image in the reference database and selecting the corresponding depth information for that 2D image; and
a generator module operable to apply the selected depth information to the matched input video frame to generate a 2D plus depth information frame.

A further aspect of the invention provides: a computer-readable medium programmed with instructions that when executed convert 2D video images from a video stream to 3D images, the instructions comprising:
providing a reference database of video frames, each entry in the database comprising a 2D image and corresponding depth information for that 2D image;
submitting input video frames to the reference database;
matching an input video frame with a 2D image in the reference database and selecting the corresponding depth information for that 2D image; and
applying the selected depth information to the matched input video frame to generate a 2D plus depth information frame.

In another aspect of the invention a method of generating a reference database comprises using software generated video frames.

In order that the present invention may be more readily understood, embodiments of the present invention are now described, by way of example, with reference to the accompanying drawings, in which:

FIG. 1—Shows a schematic diagram of an embodiment;

FIG. 2A—Shows the effect of using depth estimation, of a query image;

Figure 3:
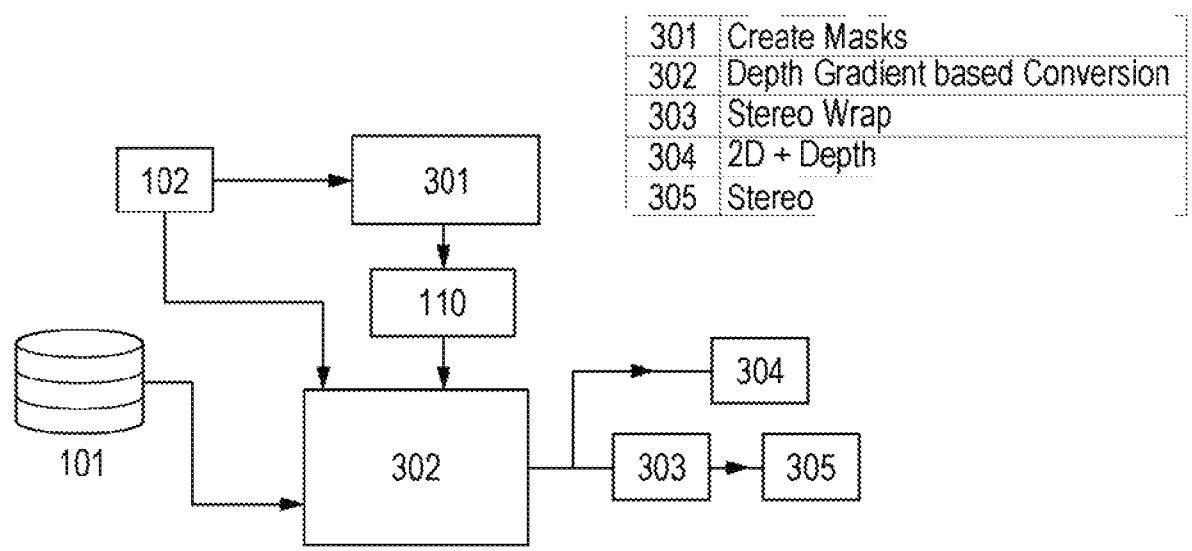
Figure 4:
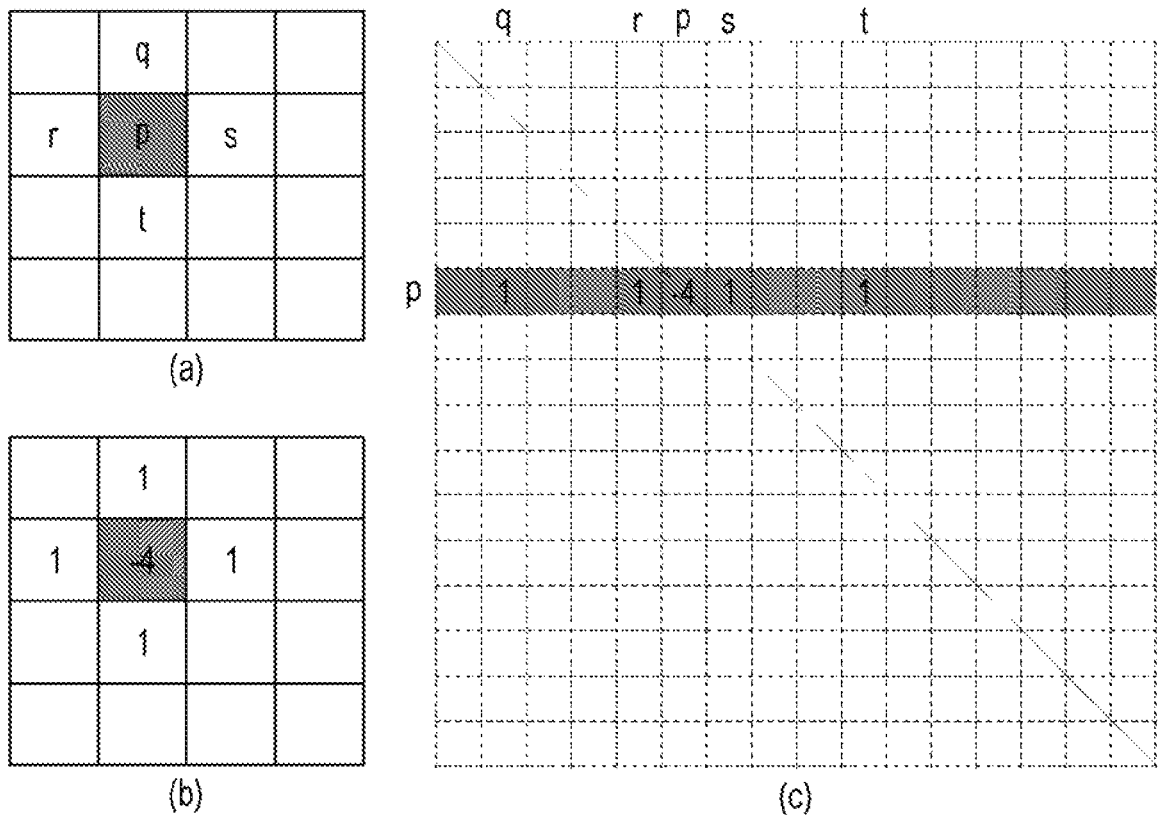
Figure 5:
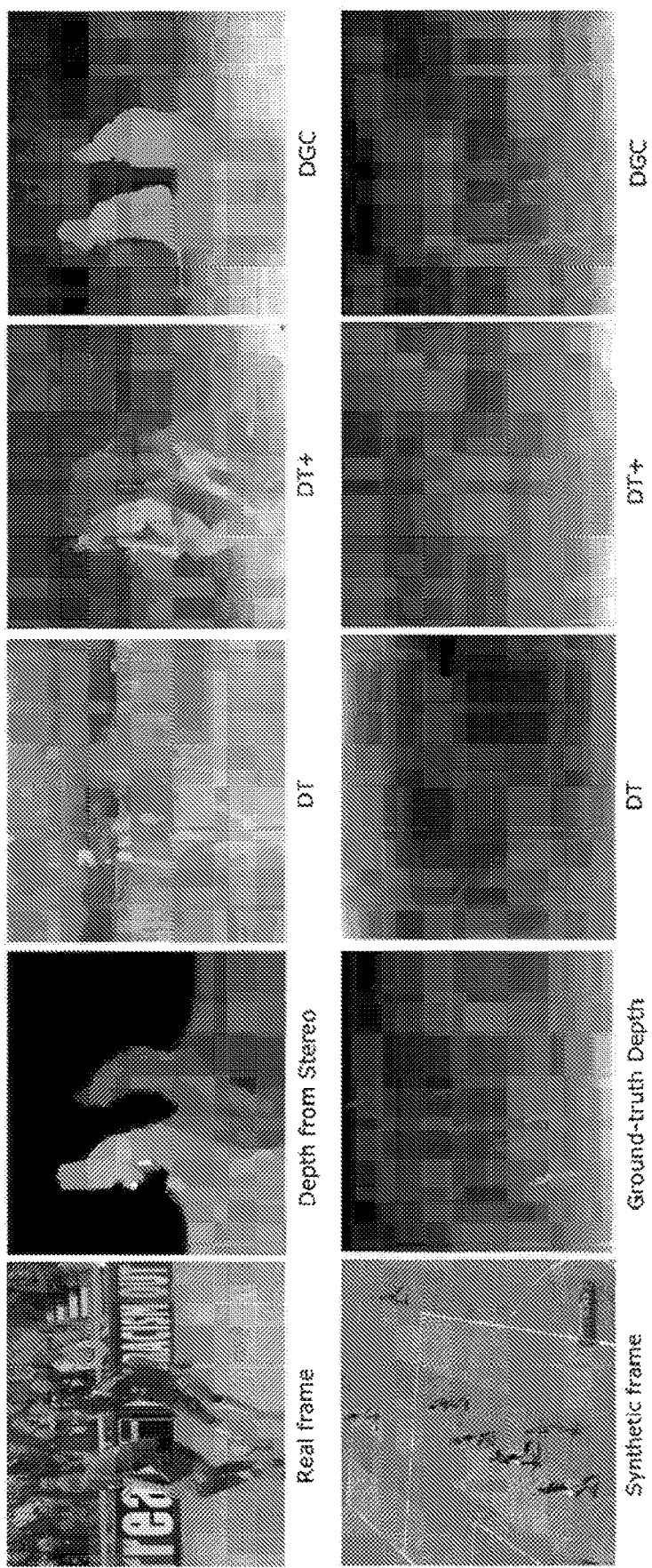
Figure 6:
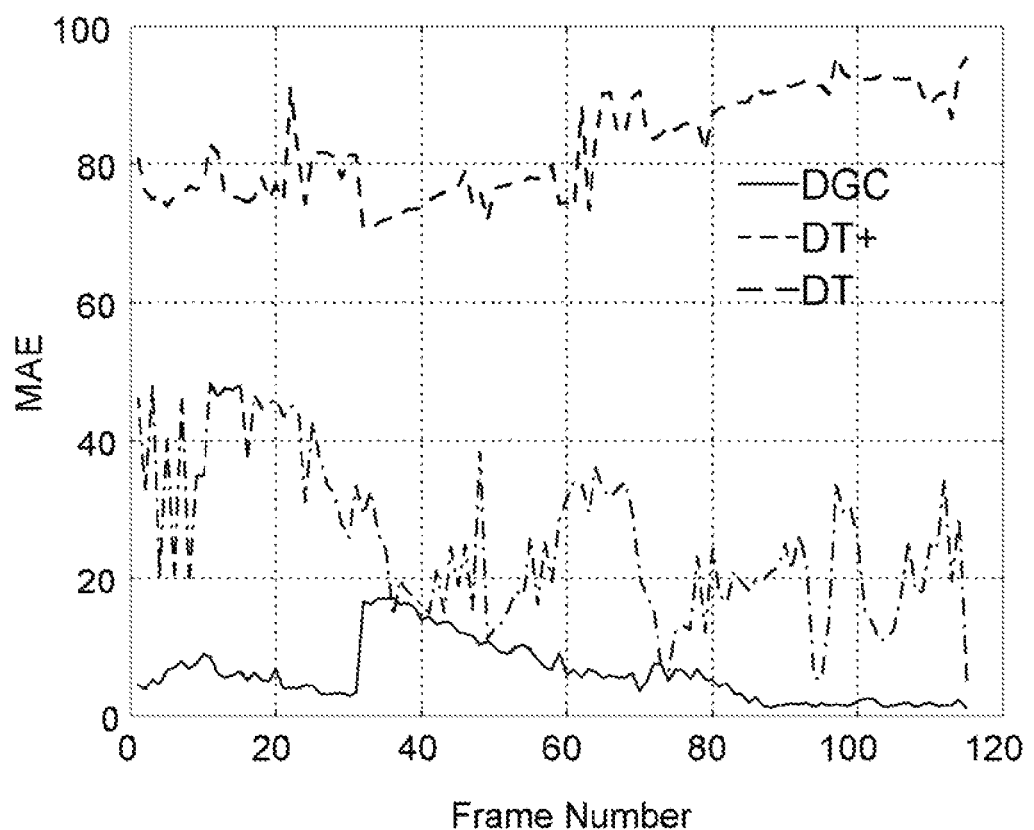
Figure 7:
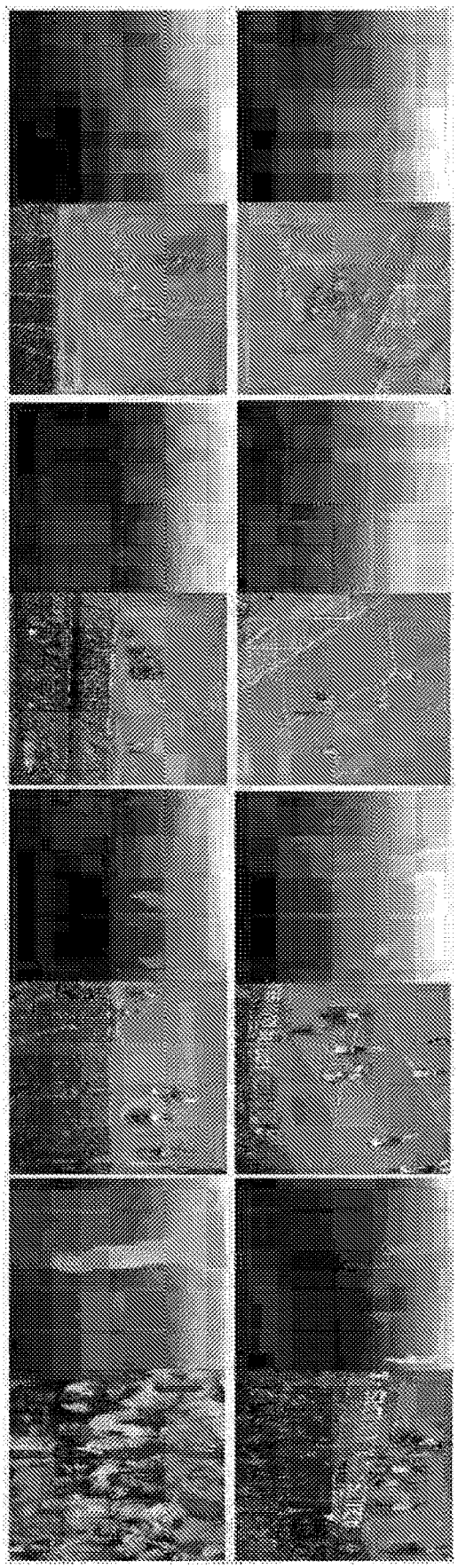
Figure 8:
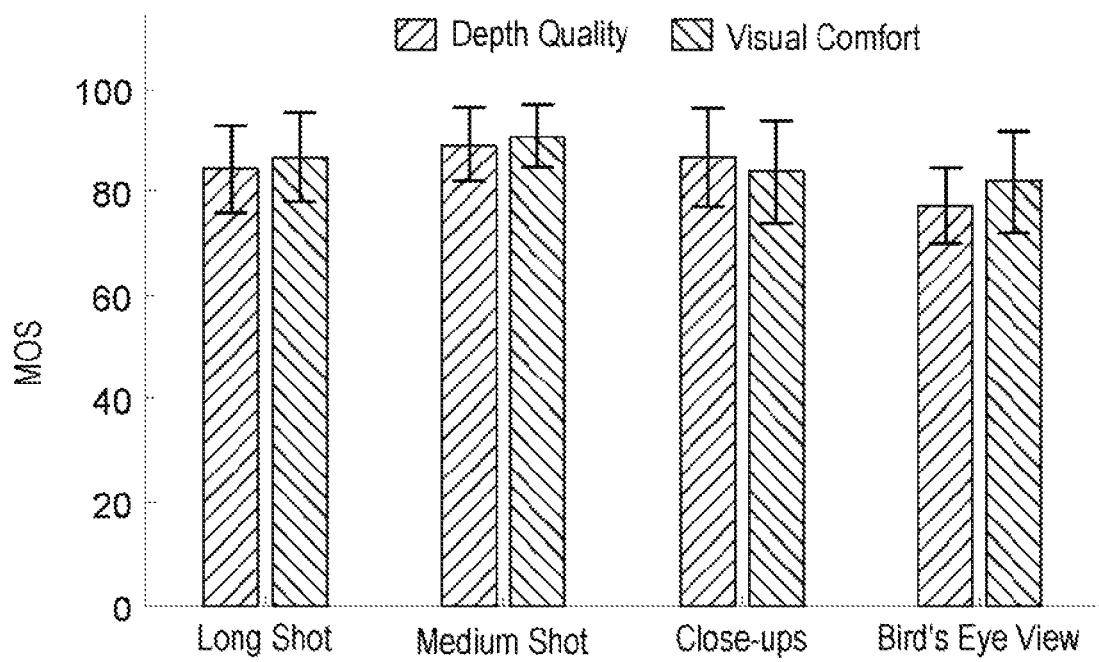
Figure 9:
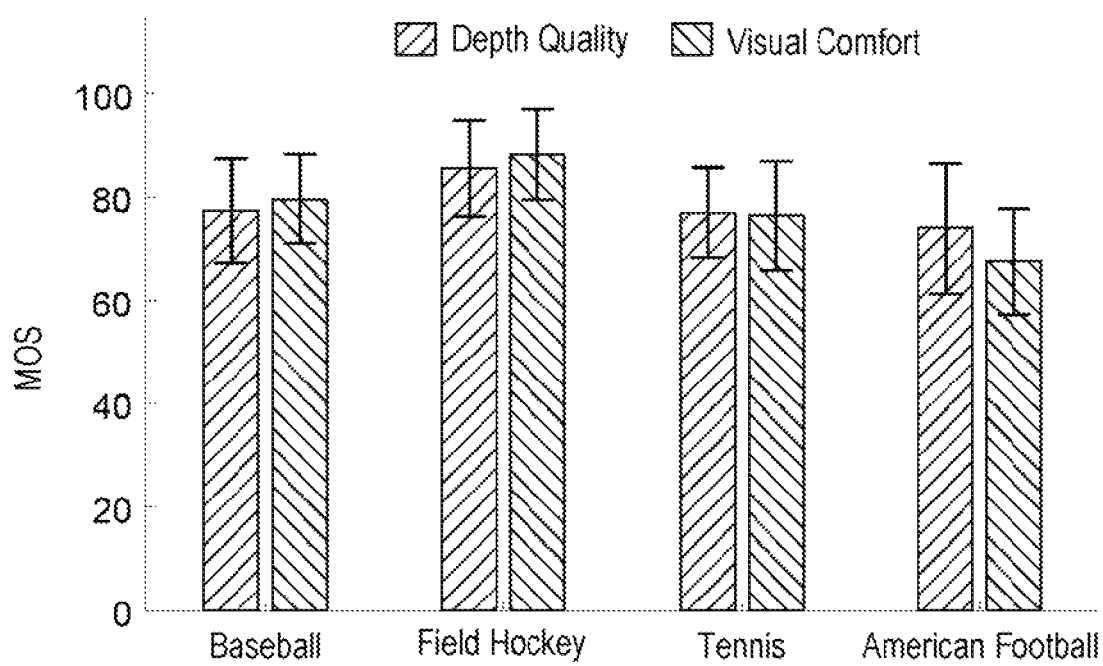
Figure 10:
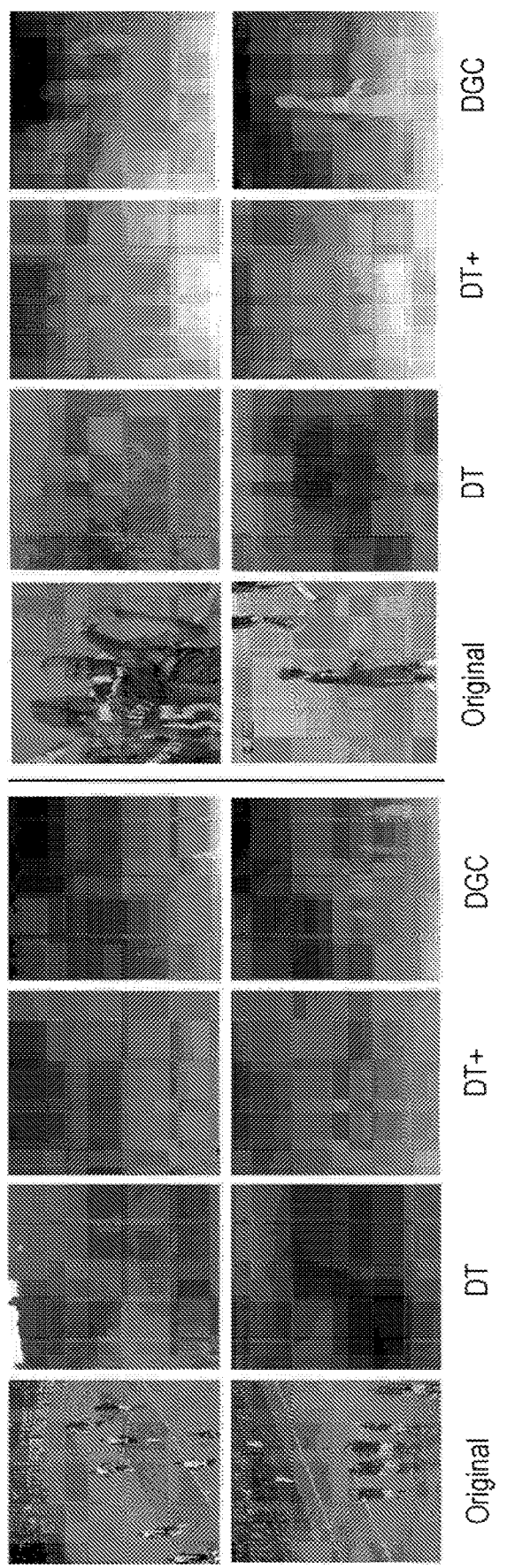
Figure 11:
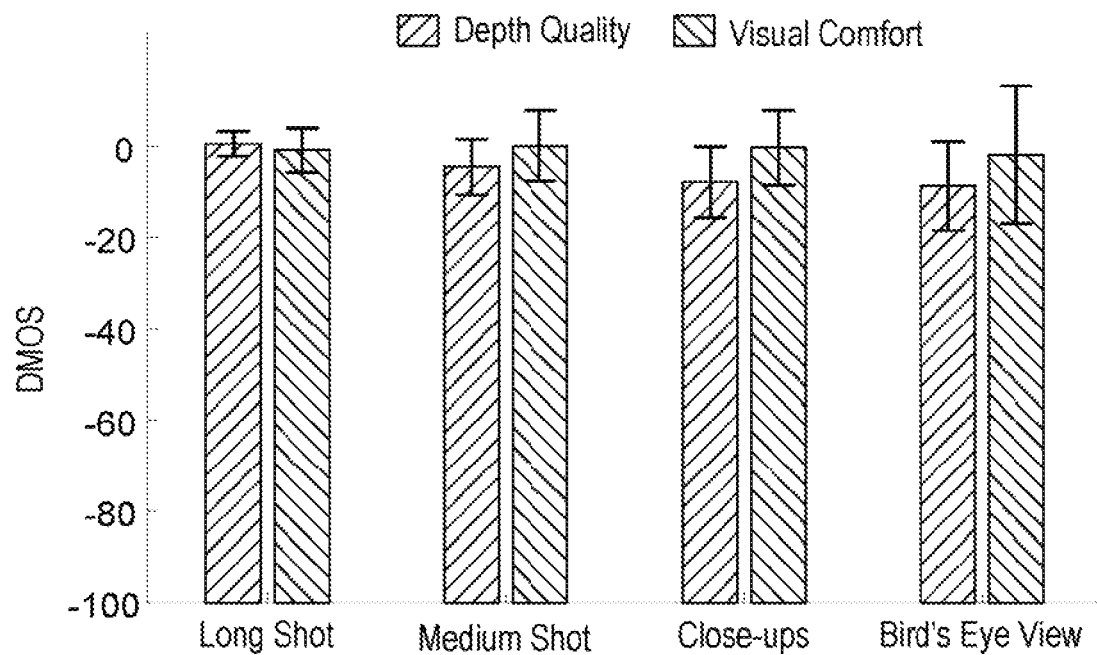
Figure 12:
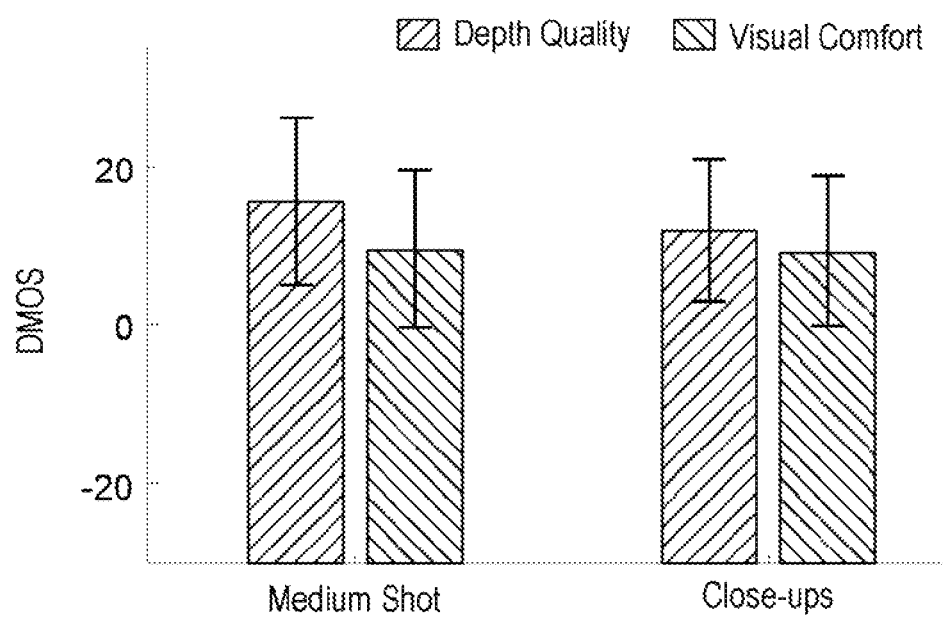

FIG. 3—Shows a schematic diagram of an embodiment;

FIG. 4—Shows a schematic diagram of the Poisson equation of matrix A, (a) an example of 4×4 image showing a sample pixel p and its neighbours, (b) the coefficients of Eq 3 for pixel p, (c) the non-zero values in matrix A for the row corresponding to pixel p;

FIG. 5—Top row: Frame 3 of a synthetic sequence. Bottom row: Frame 24 of a real sequence. We show the depth extracted using: Ground-truth/Stereo Correspondence [8], DT, DT+ and DGC. Our technique DGC best resembles the Ground-truth|Stereo Correspondence in both sequences;

FIG. 6—An objective comparison between our method DGC and the closest method in the literature DT, and its extension DT+ on a synthetic soccer sequence;

FIG. 7—shows Depth estimation for different soccer sequences using our method. Our method handles a wide variety of shots including Close-ups (e.g., top, left-most), Medium Shots (e.g., bottom, left-most), Bird's Eye View (e.g., bottom, right-most) and Long Shots (e.g., top, right-most);

FIG. 8—Mean opinion scores of depth perception and visual comfort for different types of soccer scenes;

FIG. 9—Mean opinion scores of depth perception and visual comfort for different non-soccer field sports;

FIG. 10—Depth estimation for different sequences using (from left): DT, DT+ and our method DGC. DT generates erroneous estimates, DT+ generates noisy measurements and does not detect players. Our technique outperforms both approaches;

FIG. 11—Difference mean opinion score (DMOS) between our converted sequences and the original 3D. Zero implies that our converted sequence is the same as the original 3D;

FIG. 12—Difference mean opinion score (DMOS) between our converted sequences and Depth Transfer DT+. Positive DMOS means that our technique is preferred over DT+.

FIG. 3 shows an overview of our 2D-to-3D soccer video conversion system. Our technique infers depth from a database of synthetically generated depths. This database is collected from video games, which provides high-quality depth maps. We transfer the depth gradient field from the database and reconstruct depth using Poisson reconstruction. In order to maintain sharp and accurate object boundaries, we create object masks and modify the Poisson equation on object boundaries. Finally, the 2D frames and their estimated depth are used to render left and right stereo pairs, using the stereo-warping technique in [11]. In this technique a 2D frame is warped based on its estimated depth such that salient regions remain unmodified, while background areas are stretched to fill dis-occluded regions. In this section, we discuss our synthetic 3Ddatabase and object mask creation. Sec. 4 discusses our depth estimation technique.

Synthetic 3D Database: Many databases of RGBD (Red, Green, Blue and Depth) images [2, 1, 5] and videos [11, 3] have been created. The depth channel is acquired using time-of-flight imaging [20] or active stereo (e.g., using Microsoft Kinect). Despite current RGBD databases, none of them can be used for a high-quality 2D-to-3D conversion of sporting events. Acquiring depth maps for a sport event is challenging since depth data needs to be acquired in sunlight conditions in a highly dynamic environment.

In order to address this challenge, we propose to create a Synthetic RGBD (S-RGBD) database from video games, which have very high image quality and from which a large quantity of content can be easily generated. Such database can be used for data-driven 2D-to-3D conversion. We are inspired by the success of Microsoft Kinect Pose Estimation through training on a synthetic database [22]. In our case, we collect our S-RGBD data by extracting image and depth information from FIFA13 video game. We used PIX [4], a Microsoft Directx tool. PIX records all Directx commands called by an application. By re-running these commands it can render and save each of the recorded frames. In addition, PIX allows access to the depth buffer of each rendered frame. The resolution of each extracted frame is 1916×1054 with 10 fps. We extracted 16,500 2D+Depth frames from 40 different sequences. The sequences contain a wide variety of shots expected to occur in soccer matches, with a wide spectrum of camera views, motion complexity and colour variation. Two of the 40 sequences are 6-7 minutes each, containing a half time and designed to capture the common scenes throughout a full game. The remaining sequences are shorter, in the range of 15-60 seconds, however they focus more on capturing less common events such as close-ups, behind the goal, zoomed on ground views, and so on. Our database includes different teams, stadiums, seasons and camera angles.

Creating Object Masks: In order to better handle depth discontinuities and have a sharp and clear depth on player boundaries, our approach delineates object boundaries by creating object masks. Without specifying object boundaries, the depth of players will be blended with the ground, which degrades the depth quality. To create these masks we automatically detect the objects by pre-processing each video sequence based on motion and appearance. Due to space limitations, we provide a brief description of this step. We propose two different object detection methods: one for close-ups, which are characterized by large player size and small playing area, and another for non close-ups, which have a large field view. Non close-up video segmentation relies on global features such as the playing field colour. For these shots, we use a colour-based approach to detect the playing field. We train a Gaussian Mixture Model (GMM) on samples collected from the playing field. For close-ups, we rely more on local features such as feature point trajectories [16]. We employ a matting-based approach [14] initialized with feature point trajectory segmentation. We then correct possible misclassification of the playing field using playing area detection.

Figure 1:
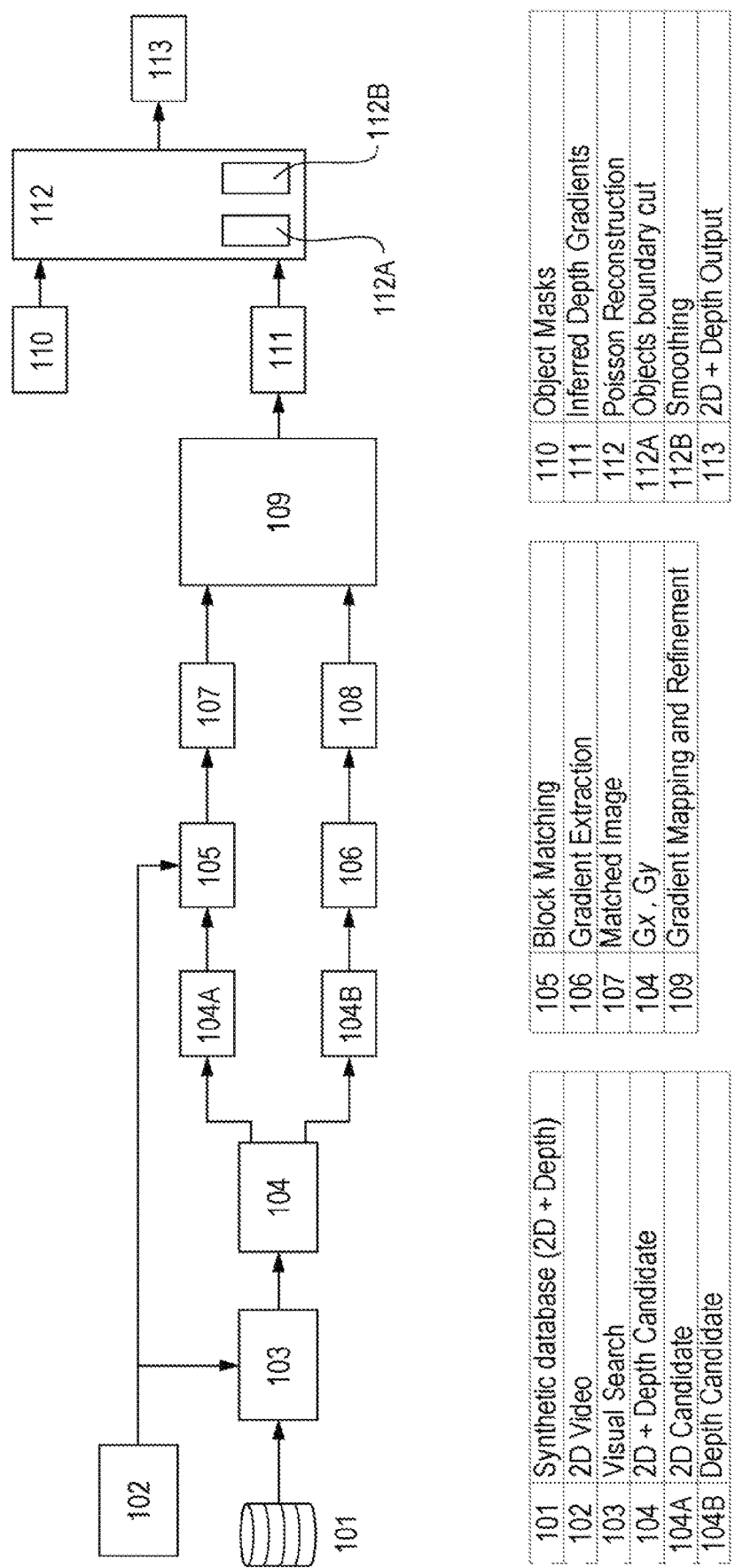

The core of our system is depth estimation from depth gradients; for an input 2D video, depth is inferred from our S-RGBD database. FIG. 1 outlines this process. For an examined 2D frame, we find the K nearest frames in our database. We create a matching image for the examined frame. This matching image is created block by block, where we find for each block in the examined frame the best matching block in the K candidate images. We then copy the depth gradients from the matched blocks (portions) to the examined frame. We finally reconstruct the depth from its copied gradients by solving a Poisson equation. We use object masks (Sec. 3) to ensure sharp depth discontinuities around object boundaries. We now discuss each step in more detail.

Figure 2A:
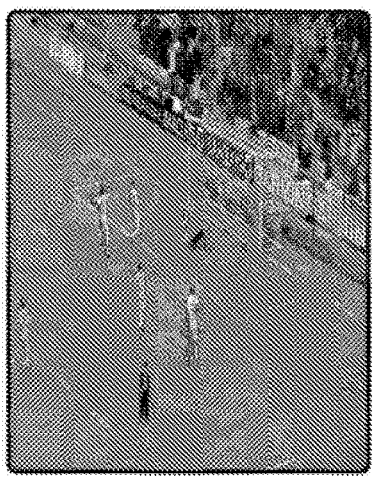
FIG. 2B shows a subset of K candidates of the query image.
FIG. 2C shows a created matched image.
FIG. 2D shows object boundary cuts.
FIG. 2E shows a depth estimation using Poisson reconstruction.
FIG. 2F shows a gradient refinement and Poisson reconstruction.
FIG. 2G shows depth with object boundary cuts.
FIG. 2H shows a final depth estimation with smoothness.
FIG. 2I shows a zoomed and amplified version of the yellow block h.
Figure 2B:
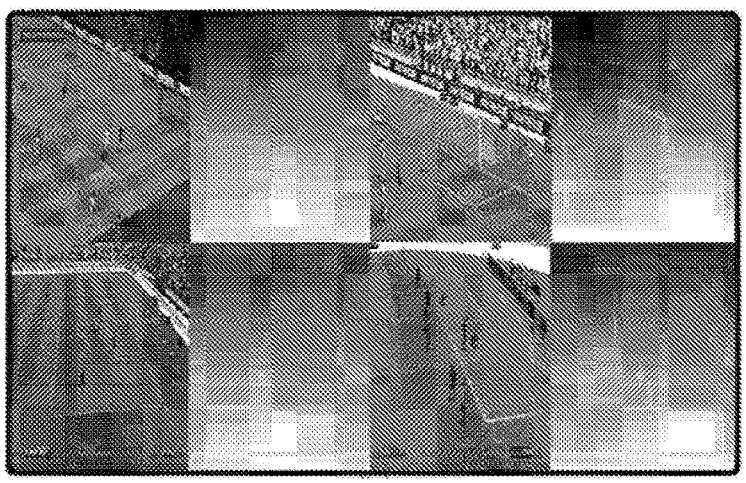

For each frame of the examined video we preform visual search on our S-RGBD database to identify the K (=10 in our work) most similar frames. We use two main features for visual search: GIST [17] and Colour. The former favours matches with overall similar structure, while the latter favours matches with overall similar colour. For colour, we use a normalized histogram of hue values, to which we apply a binary thresholding with value 0.1 to represent only dominant colours. The final image search descriptor is the concatenation of GIST and the colour histogram. FIG. 2B shows 4 samples of the K candidates generated for the frame in FIG. 2A.

We use the K candidate images to construct an image similar to the examined frame, which we call a matched image. The matched image provides a mapping between the candidates and the examined frame where each pixel in the examined frame is mapped to a corresponding candidate pixel. Karsch et al. [11] use a global approach for such mapping. They warp the candidates to construct images similar to the examined frame. While this approach is robust to local image artefacts, it requires strong similarity between the examined frame and the database. For instance, if the examined frame contains 4 players, the database needs to have an image with similar content. Instead, we use a local approach and construct similar images by block matching. This enables us to perform a more robust matching. For instance, we can have a good matching between two frames despite being shot from different angles, with different number of players and in different locations. This is shown in the example in FIG. 2A-2I where the images in FIG. 2B were used to create the high-quality matched image (FIG. 2C), which may not have been possible using the global approach in [11]. Our local approach achieves good depth estimation without requiring a massive database size, which is a highly desirable advantage for our method since creating accurate 3D database is difficult as discussed in Sec. 3.

Figure 2C:

In order to construct the matching image, we first divide the examined frame into n×n blocks (portions). In all our experiments, n is set to 9 pixels. For each block of the examined frame, we compare it against all possible blocks (portions) in the K candidate images. We choose the block with the smallest Euclidean distance as the corresponding block. The candidate images are re-sized to the examined frame size. For block descriptor we use SIFT concatenated with the average RGB value of the block. SIFT descriptor is calculated on a larger patch of size 5n_5n, centered on the block center. This is to capture more representative texture. RGB values are normalized between 0-1. FIG. 2C shows the matched image using our block matching approach.

Notice that the vertical advertisement boards are all matched to vertical blocks (portions), the horizontal playing field is matched to the horizontal playing field, and the tilted audience are also matched to the audience.

Computing Depth Gradients: Given an input frame and its matched image from S-RGBD, we copy the corresponding depth gradients. We copy the first order spatial derivatives of both horizontal and vertical directions ($G_x$, $G_y$). Similar to image matching, we copy the gradients from the corresponding blocks (portions) in blocks (portions) of n×n pixels.

Poisson Reconstruction:

We reconstruct the depth values from the copied depth gradients using the Poisson equation:

$$\left(\frac{\partial^2}{\partial x^2} + \frac{\partial^2}{\partial y^2}\right)D = \nabla \cdot G, \quad (1)$$

where $G=(G_x, G_y)$ is the copied depth gradient and D is the depth we seek to estimate. $\nabla G$ is the divergence of G:

$$\nabla \cdot G = \left(\frac{\partial G_x}{\partial x} + \frac{\partial G_y}{\partial y}\right). \quad (2)$$

In the discrete domain, Eq. (1) and Eq. (2) become Eq. (3) and Eq. (4), respectively:

$$D(i,j+1)+D(i,j-1)-4D(i,j)+D(i+1,j)+D(i-1,j)=\nabla \cdot G(i,j). \quad (3)$$

$$\nabla \cdot G(i,j)=G_x(i,j)-G_x(i,j-1)+G_y(i,j)-G_y(i-1,j) \quad (4)$$

Figure 2D:
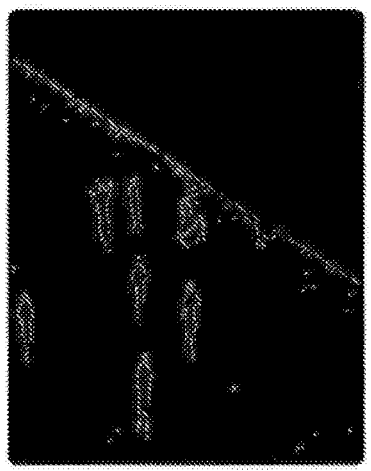
Figure 2E:
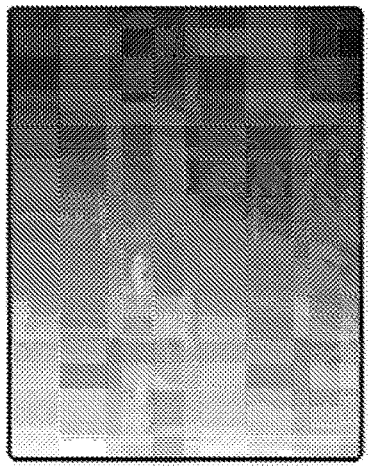

We formulate a solution in the form of Ax=b, where b=$\nabla$ G, x=D, and A stores the coefficients of the Poisson equation (Eq. (3)). For an examined image of size H×W, A is a square matrix with size HW×HW, where each row corresponds to a pixel in the examined frame. Values in this row correspond to the coefficients of Eq. (3). FIG. 4 (a) illustrates setting up A for a small sample image. Note that extra care should be given to the image boundary pixels as one or more neighbours do not exist. In this case, we update the value of ∇ G by removing the terms in Eq. (4) that refer to non-existing pixels. Finally, given Ax=b, we solve for x. FIG. 2E shows an example of the reconstructed depth (x).

While the overall depth structure is captured, some artefacts are present (see the lower right corner of FIG. 2E).

Such artefacts are often generated due to inaccurate SIFT matching. For instance, in FIG. 4 (c) some field blocks (portions) are matched to non-field areas. When a query block from a region which is expected to have smooth depth (such as the field) incorrectly matches a reference block that contains sharp changes in depth (such as the goal or player borders), the sharp gradients transferred from the reference block can introduce small artefacts in the resulting depth. To overcome this problem, before solving for x, we first reduce the large transferred gradients by gradient refinement, and use our object masks to impose depth discontinuities in the proper places instead. These two steps are described in the following.

Gradient Refinement:

To reduce the errors introduced due to some incorrect block matchings, we refine depth gradients using:

$$G_x = G_x \times \max\left(1 - e^{\left(1 - \frac{1}{\alpha|G_x|}\right)}, 0\right) \quad (5)$$

$$G_y = G_y \times \max\left(1 - e^{\left(1 - \frac{1}{\alpha|G_y|}\right)}, 0\right)$$

Figure 2F:
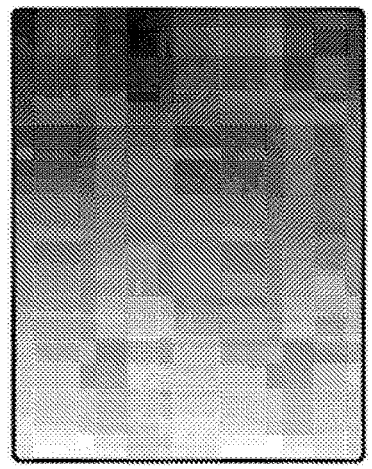

This maintains low gradients while exponentially reducing large gradients which may be incorrectly estimated. α is a parameter that configures the strength of refinement. A high α can corrupt correct gradients, while a low α can allow artefacts. For all our experiments, a is set to 60. FIG. 2F shows the effect of gradient refinement on depth estimation for FIG. 2A. In comparison to 2(e), artefacts are removed and depth becomes smoother.

Object Boundary Cuts:

Poisson reconstruction connects a pixel to all its neighbours. This causes most object boundaries to fade, especially after gradient refinement where strong gradients are eliminated (see FIG. 2F). To solve this problem, we allow depth discontinuities on object boundaries by modifying the Poisson equation there. Given object masks, we detect edges through the Canny edge detector (see FIG. 2D). We then disconnect pixels from the object boundaries by not allowing them to use an object boundary pixel as a valid neighbour. For each pixel neighbouring a boundary pixel, we set the corresponding connection in A to 0 and update its ∇ G value accordingly. Hence, pixels adjacent to object boundaries are treated similar to image boundary pixels.

Figure 2G:
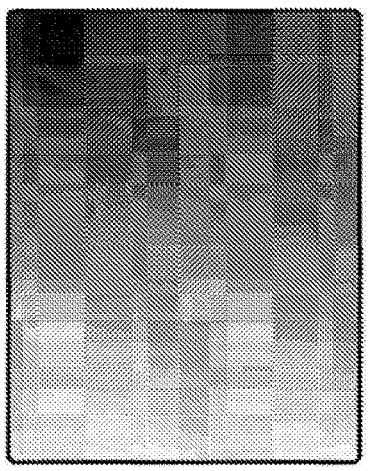
Figure 2H:
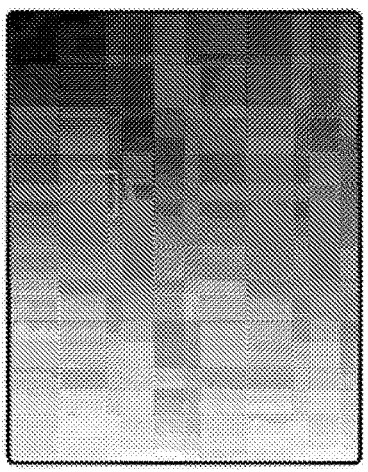

Note that Poisson reconstruction becomes erroneous if a pixel or a group of pixels are completely disconnected from the rest of the image. This can cause isolated regions to go black and/or can affect depth estimation of the entire image. Hence, it is important to keep object boundary pixels connected to the rest of the image, while ensuring that the two sides of the boundary are still disconnected. To do so, we connect each boundary pixel to either its top or bottom pixel. If a boundary pixel is more similar to its top pixel in the query image, we connect it to the top pixel, otherwise we connect it to the bottom pixel. Thus, each boundary pixel becomes a part of its upper or lower area while keeping the two areas non accessible for each other. We also noticed that holes are frequently found inside the object masks due to segmentation errors. Applying edge detection on such masks will isolate these holes from the rest of the image. To avoid these problems, we fill such holes prior to edge detection. Note however that applying edge detection on the objects themselves will surround them by boundary pixels and hence isolate them from the background. To overcome this problem, we open each object boundary from its bottom (i.e., player legs). This allows Poisson to diffuse depth from the ground to the objects, producing a natural depth while avoiding isolations. FIG. 2D shows the object boundaries generated for FIG. 2A. FIG. 2G shows the estimated depth when object boundaries are cut during Poisson reconstruction. In comparison to FIG. 2F, the players now are more visible in FIG. 2G.

Smoothness: We add smoothness constraints to the Poisson reconstruction by enforcing the higher-order depth derivatives to be zero. In continuous domain we set $$\left(\frac{\partial^4}{\partial x^4} + \frac{\partial^4}{\partial y^4}\right)D = 0. \quad (6)$$

In the discrete domain this becomes:

$$12D(i,j)+D(i,j+2)-4D(i,j+1)-4D(i,j-1)+D(i,j-2)+D(i+2,j)-4D(i+1,j)-4D(i-1,j)+D(i-2,j)=0. \quad (7)$$

We generate $A_s$, a smoothed version of A. We fill $A_s$ with the new coefficients of Eq. (7). In order to preserve depth discontinuities around object boundaries, we apply the boundary cuts to the smoothness constraints. We then concatenate A with As and solve $$\begin{bmatrix} A \\ \beta \cdot A_x \end{bmatrix} x = \begin{bmatrix} b \\ 0 \end{bmatrix}, \quad (8)$$

instead of the original Ax=b. β configures the amount of required smoothness. Large β can cause over-smoothness while a low β can generate weak smoothness. For all experiments, we set β=0:01. Note that the effect of smoothness is different from that of gradient refinement. The latter is designed to remove sharp artefacts while keeping the rest of the image intact; smoothness adds a delicate touch to all depth textures. Using smoothness to remove sharp artefacts may cause over-smoothing. In addition, strong gradient refinement will damage essential gradients.

Figure 2I:
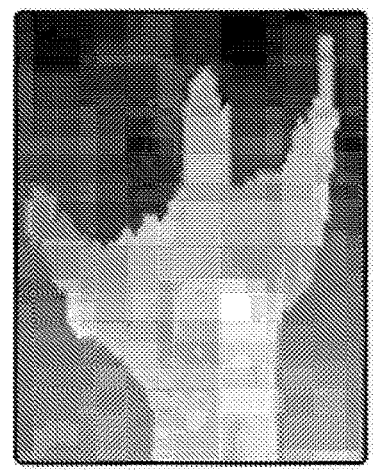

Creating Final Output:

The estimated depth (x in Eq. (8)) is normalized between (0; 255) and combined with the query image to form the converted 2D+Depth of our query video. FIG. 2F shows the final estimated depth for FIG. 2A, including all steps with smoothness. Our depth is smooth and correctly reassembles the depth of the field, audience and players. We also note that our method does not produce 'card-board effect', where each player is assigned the same depth. To show this, we zoom on a depth block from one of the players in FIG. 2H and amplify it by normalizing the depth values of the block to the range of (0; 255). FIG. 2I shows the zoomed and amplified version of the yellow marked block in 2H. Note that the player in the marked block has different depth values for its different body parts. This example shows the strength of our gradient-based approach in estimating small depth details.

We evaluate the implemented aspects of the invention which we refer to in the figures as DGC, short for Depth Gradient-based Conversion. We consider both synthetic and real sequences and we compare against ground-truth where available. We also compare against the closest system in the literature [11], which we refer to as DT (for Depth Transfer). In addition, we show the potential of applying our technique to other field sports, and the results show promising 2D-to-3D conversions for Tennis, Baseball, American Football and Field Hockey.

Note that our method has a few parameters, which are experimentally tuned once for all sequences. Specifically, K (the number of candidate images) is set to 10, n (the block size) is set to 9, α (the gradient refinement parameter) is set to 60, and β (the smoothness parameter) is set to 0.01.

We compare our 2D-to-3D conversion technique (DGC) against several techniques.

DT:

The Depth Transfer method [11] trained on its own database. Depth Transfer is the state-of-the-art data-driven 2D-to-3D conversion. Its database, MSR-V3D, contains videos captured by Microsoft Kinect, and is available online.

DT+:

The Depth Transfer method trained on our synthetic database (reference database) S-RGBD. As stated in [11], Kinect 2D+Depth capture is limited to indoor environments. This plus its erroneous measurements and poor resolution limits its ability to generate a large soccer database. For rigorous comparison, we compare our technique against Depth Transfer when trained with our soccer database.

Ground-Truth Depth:

Ground-truth depth maps are extracted from the FIFA13 video game through PIX [4] as described in Sec. 3. This, however, is only available for synthetic data.

Original 3D:

The original side-by-side 3D video captured by 3D cameras. We compare results subjectively.

Depth from Stereo:

In order to objectively compare results against Original 3D footage, we use stereo correspondence [8] to approximate ground-truth depth. Note that stereo correspondence techniques are not always accurate. However, our results show that sometimes they capture the overall structure of the depth and hence could be useful for objective analysis.

Aspects of the invention have been applied to eight real test sequences: four soccer and four non-soccer. We also have one synthetic soccer sequence (referred to as Synth).

Soccer:

Our real soccer sequences contain extracted dips from original 3D-shot videos. These sequences are carefully created to include four main categories: long shots, bird's eye view, medium shots and close-ups. In long shots, the camera is placed at a high position and the entire field is almost visible (FIG. 7, top right-most). Bird's eye view is similar but the camera is placed above the field (FIG. 7, bottom right-most). Medium shots have the camera in a lower height, with a smaller field view (FIG. 7, bottom left-most). Close-ups have the camera zoomed on one or few players with a small field view (FIG. 7, top left-most).

Non-Soccer:

Our real non-soccer sequences contain clips from Tennis, Baseball, American Football and Field Hockey. We use these sequences to assess the potential application of our method on other field sports.

Synth:

We extract 120 2D+Depth synthetic frames in a similar manner to S-RGBD creation. Given the ground-truth depth, we compare our technique objectively against DT and DT+ using this synthetic sequence.

We preform objective experiments, where the experiments use aspects of the invention, on both real and synthetic sequences to measure the quality of our depth maps. FIG. 5 (top) shows a frame of the synthetic sequence and its ground-truth depth followed by its estimated depth using DT, DT+ and our DGC. Note that all depth maps are normalized to the range of (0-255). DT generates largely erroneous measurements as MSR-V3D hardly resembles soccer data. DT+ generates significantly better results as being trained on our database. Yet most players are not detected. Our technique DGC detects players, generates smooth results and best resembles ground-truth. FIG. 6 shows the Mean Absolute Error (MAE) against ground-truth for the whole 120 frames of Synth. The figure shows that our method produces much lower MAE than DT and DT+.

Objective analysis on real sequences is challenging due to the absence of ground-truth depth. In [11], the authors used Kinect depth as ground-truth. However, Kinect is not capable of capturing depth information in outdoor environments and hence it cannot generate ground-truth estimates for soccer matches. Instead, we follow a different approach. Given a soccer sequence shot in 3D, we use stereo correspondence [8] to approximate the ground-truth depth-map. We then compare it against the depth estimated from 2D-to-3D conversion. FIG. 5 (bottom) shows a frame from one of the most challenging soccer test sequences and its extracted depth using stereo correspondence. While far from perfect, the overall depth structure is present and hence can be exploited to infer how good the converted depth is. In FIG. 5 (bottom), we show the estimated depth using DT, DT+ and our DGC. Our technique DGC best reassembles ground-truth. This is also captured objectively over a range of 100 frames, where DGC reduces MAE up to 19% and 86% compared to DT and DT+ respectively. Figure is omitted due to space limitations.

In addition, we performed an experiment to investigate the importance of the synthetic database (reference database) size. First, we created a synthetic sequence using 120 frames from a wide variety of shots that can occur in soccer matches. We examined six database sizes, 1000, 2000, 4000, 8000, 13000 and 16000 images. Results showed that up to a size of 8,000, the performance fluctuates around an MAE of 30, due to the absence of big enough data.

However, there is a boost in performance starting from 13,000 images which reduces MAE to around 20. The performance stabilizes around 16,000 images in the database. Hence, we used a database of 16,500 images in our evaluation.

We assess the 3D visual perception through several subjective experiments. We compare our technique against DT+ and the original 3D.

Setup

We conduct subjective experiments according to the ITU BT.2021 recommendations [6], which suggests three primary perceptual dimensions for 3D video assessment: picture quality, depth quality and visual (dis)comfort. Picture quality is mainly affected by encoding and/or transmission. Depth quality measures the amount of perceived depth, and visual discomfort measures any form of physiological unpleasant-ness due to 3D perception, i.e., fatigue, eyestrain, head-ache, and so on. Such discomforts often occur due to 3D artefacts, depth alteration, comfort zone violations and/or cross talk. In our experiments, we measure depth quality and visual comfort. We do not measure picture quality because we do not change any compression or encoding parameters, nor do we transmit the sequences.

Each of our test sequences has a duration between 10-15 seconds according to the ITU recommendations. We display sequences on a 55" Philips TV-set with passive polarized glasses, in low lighting conditions. The viewing distance was around 2 m for 1920×1080 resolution videos and around 3 m for 1280×720 videos according to the ITU recommendations. Fifteen subjects took part in the subjective experiments. They were all computer science students and researchers. Their stereoscopic vision was tested prior to the experiment using static and dynamic random dot stereograms. Prior to the actual experiments, subjects went through a stabilization phase. They rated 4 sequences representative of different 3D quality, from best to worst. Those 4 sequences were not included in the actual test. This step stabilized subjects expectations and made them familiar with the rating protocol. We asked subjects to clarify all their questions and ensure their full understanding of the experimental procedure.

Evaluation of Our Technique

We evaluate our 2D-to-3D conversion by measuring the average subject satisfaction when observing our converted sequences. We examine the 4 soccer and the 4 non-soccer sequences. We use the single-stimulus (SS) method of the ITU recommendations to assess depth quality and visual comfort. The sequences are shown to subjects in random order. Each sequence is 10-15 sec and is preceded by a 5 sec mid-grey field indicating the coded name of the sequence, followed by a 10 sec mid-grey field asking subjects to vote. We use the standard ITU continuous scale to rate depth quality and comfort. The depth quality labels are marked on the continuous scale, and are Excellent, Good, Fair, Poor, and Bad, while the comfort labels are Very Comfortable, Comfortable, Mildly Uncomfortable, Uncomfortable, and Extremely Uncomfortable. Subjects were asked to mark their scores on these continuous scales. We then mapped their marks to integer values between 0-100 and calculated the mean opinion score (MOS).

FIG. 8 shows the MOS for the soccer sequences. In the four soccer sequences most subjects rated DGC in the Excellent range. FIG. 7 shows some of the estimated depth images. Note how we can handle a wide variety of video shots, including different camera views and clutter.

FIG. 9 shows the MOS for the non-soccer sequences. Field Hockey scored the highest as it resembles soccer the most. American Football scored the lowest, however. While some subjects reported very good depth, others reported the difficulty of depth perception due to the high dynamic environment of American Football with strong occlusions and clutter. Those subjects also reported a Mild Discomfort for the same reasons. It is important to note that the results on non-soccer are only meant to show the potential of our method, as we actually used the soccer database to convert them. In the future, we will create more diverse database for different sports.

Comparison Against Original 3D

We compare our 2D-to-3D conversion against original 3D videos shot using stereo cameras. We use the Double Stimulus Continuous Quality Scale (DSCQS) method of the ITU recommendations for this experiment. Based on DSCQS, subjects view each pair of sequences (our created 3D and original 3D) at least twice before voting so as to assess their differences properly. The sequences are shown in random order without the subjects knowing which is original and which is converted. The subjects were asked to rate both sequences for depth quality and comfort using the standard ITU continuous scale. We then mapped their marks to integer values between 0-100 and calculated the Difference Opinion Score (=score for DGC−score for original 3D). Finally we calculated the mean of the difference opinion scores (DMOS).

A DMOS of zero implies that our converted 3D is judged the same as the original 3D, while a negative DMOS implies our 3D has a lower depth perception/comfort than the original 3D. FIG. 11 shows the DMOS of each of the soccer sequences for both depth quality and visual comfort. Our conversion is comparable to the original 3D, especially in long shots which account for around 70% of a full soccer game [9]. It is interesting to note that some subjects found our conversion more comfortable than the original 3D. They reported that the popping out effect in original 3D was sometimes causing discomfort.

Comparison Against State-of-the-Art

We compare our 3D conversion against Depth Transfer DT+ [11]. As in the previous experiments, we use the DSCQS evaluation protocol and calculate DMOS for both depth quality and visual comfort. We examined the most challenging soccer sequences, close-up and medium shots. Their wide variety of camera angles, complex motion, clutter and occlusion makes them the most challenging sequences for 2D-to-3D conversion. FIG. 12 shows the DMOS of the close-up and medium shot against DT+. Our technique outperforms DT+ by an average of 15 points in medium shots and 12 points in close-ups. In addition, all 15 subjects rated our technique higher or equal to DT+ and the differences reported are statistically significant (p-value <0.05). FIG. 10 shows some extracted depth maps for DT, DT+ and our DGC. Note that the original implementation of Depth Transfer is DT and this is much worse than DT+ (see FIG. 10). Furthermore, in addition to the lower subjective scores of DT+, their depth is sometimes very noisy (see FIG. 10 and FIG. 5). This could cause eye-strain on the long term.

We measure the running time for DGC and DT+ averaged over 545 close-up frames and 1,726 non close-up frames. The spatial resolution is 960×1080 pixels. DGC takes 3.53 min/frame for close-ups and 1.86 min/frame for non close-ups. The average processing time for DT+ is 15.2 min/frame, which is slower than our technique in both close-ups and non close-ups. DGC requires more time for close-ups due to the more expensive mask creation step. As non close-ups can account for up to 95% of a soccer game [9], we can benefit from the faster non close-up processing. Nevertheless, we cannot ignore close-ups as they often contain rich depth information. Future efforts for improving computational complexity can focus on spatio-temporal multi-resolution schemes for video processing. All numbers are reported from processing on a server with six processors Intel Xeon CPU E5-2650 0 @2.00 GHz, with 8 cores, with a total of 264 GB RAM and 86 GB Cache.

Aspects of the invention provide a 2D-to-3D video conversion method, we use soccer as an example to show real time conversion using computer generated images and depth information in a reference database (synthetic 3D database). Prior methods cannot handle the wide variety of scenes and motion complexities as used in the example of soccer matches. Our method is based on transferring depth gradients from a synthetic database (reference database) and estimating depth through Poisson reconstruction. We implemented the proposed method and evaluated it using real and synthetic sequences. The results show that our method can handle a wide spectrum of video shots present, for example in soccer games, including different camera views, motion complexity, occlusion, clutter and different colours. Participants in our subjective studies rated our created 3D videos Excellent, most of the time. Experimental results also show that our method outperforms state-of-the-art objectively and subjectively, on both real and synthetic sequences.

Aspects of the invention impact the area of 2D-to-3D video conversion, and potentially 3D video processing in general. First, domain-specific conversion can provide much better results than general methods. Second, transferring depth gradient on block basis not only produces smooth natural depth, but it also reduces the size of the required reference database. Third, synthetic databases (reference databases) created from computer-generated content can easily provide large, diverse, and accurate texture and depth references for various 3D video processing applications.

Aspects of the invention can be extended in multiple directions. For example, converting videos of different sports may require creating larger synthetic databases (reference databases).

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

[1] Berkeley 3-D object dataset. http://kinectdata.com/.
[2] Make3D. http://make3d.cs.cornell.edu/data.html.
[3] NYU depth dataset v2. http://cs.nyu.edu/~silberman/datasets/nyu_depth_v2.html.
[4] Performance Invistigator for Xbox (PIX). https://msdn.microsoft.com/en-us/library/windows/desktop/ee663275%28v=vs.85%29.aspx.
[5] RGB-D object dataset. http://rgbd-dataset.cs.washington.edu/.
[6] ITU-R BT.2021, Subjective methods for the assessment of stereoscopic 3DTV systems. Geneva, Switzerland, November 2012. International Telecommunication Union.
[7] P. Bhat, B. Curless, M. Cohen, and C. Zitnick. Fourier analysis of the 2D screened poisson equation for gradient domain problems. In Proc. of European Conference on Computer Vision (ECCV'08), pages 114{128. Marseille, France, October 2008.
[8] T. Brox, A. Bruhn, N. Papenberg, and J. Weickert. High accuracy optical ow estimation based on a theory for warping. In Proc. of European Conference on Computer Vision (ECCV'04), pages 25{36, Prague, Czech Republic, May 2004.
[9] K. Calagari, K. Templin, T. Elgamal, K. Diab, P. Didyk, W. Matusik, and M. Hefeeda. Anahita: A System for 3D Video Streaming with Depth Customization. In Proc. of ACM Multimedia (MM'14), pages 337{346, Orlando, Fla., November 2014.
[10] D. Hoiem, A. A. Efros, and M. Hebert. Automatic photo pop-up. ACM Transactions on Graphics, 24(3):577{584, 2005.
[11] K. Karsch, C. Liu, and S. B. Kang. Depth transfer: Depth extraction from video using non-parametric sampling. IEEE Transactions on Pattern Analysis and Machine Intelligence, 36(11):2144{2158, 2014.
[12] J. Ko. 2D-to-3D Stereoscopic Conversion: Depth Estimation in 2D Images and Soccer Videos. Master's thesis, Korea Advanced Institution of Science and Technology (KAIST), 2008.
[13] J. Konrad, M. Wang, P. Ishwar, C. Wu, and D. Mukherjee. Learning-based, automatic 2D-to-3D image and video conversion. IEEE Transactions on Image Processing, 22(9):3485{3496, 2013.
[14] A. Levin, D. Lischinski, and Y. Weiss. A closed-form solution to natural image matting. IEEE Transactions on Pattern Analysis and Machine Intelligence, 30(2): 228{242, 2008.
[15] C.-W. Liu, T.-H. Huang, M.-H. Chang, K.-Y. Lee, C.-K. Liang, and Y.-Y. Chuang. 3D cinematography principles and their applications to stereoscopic media processing. In Proc. of ACM Multimedia Conference (MM'11), pages 253{262, Scottsdale, Ariz., November 2011.
[16] P. Ochs, J. Malik, and T. Brox. Segmentation of moving objects by long term video analysis. IEEE Transactions on Pattern Analysis and Machine Intelligence, 36(6): 1187{1200, 2014.
[17] A. Oliva and A. Torralba. Modeling the shape of the scene: a holistic representation of the spatial envelope. International Journal of Computer Vision, 42(3):145{175, 2001.
[18] P. P_erez, M. Gangnet, and A. Blake. Poisson image editing. ACM Transactions on Graphics, 22:313{318, 2003.
[19] R. Rzeszutek, R. Phan, and D. Androutsos. Depth estimation for semi-automatic 2D to 3D conversion. In Proc. of ACM Multimedia Conference (MM'12), pages 817{820, Nara, Japan, October 2012.
[20] A. Saxena, S. H. Chung, and A. Y. Ng. Learning depth from single monocular images. In Proc. of Advances in Neural Information Processing Systems (NIPS'05), pages 1161{1168, Vancouver, Canada, December 2005.
[21] L. Schnyder, O. Wang, and A. Smolic. 2D to 3D conversion of sports content using panoramas. In Proc. of IEEE Conference on Image Processing (ICIP'11), pages 1961{1964, Brussels, Belgium, September 2011.
[22] J. Shotton, A. Fitzgibbon, M. Cook, T. Sharp, M. Finocchio, R. Moore, A. Kipman, and A. Blake. Real-time human pose recognition in parts from single depth images. In Proc. of IEEE Conference on Computer Vision and Pattern Recognition (CVPR'11), pages 1297{1304, Providence, R.I., June 2011.
[23] W. Wu, A. Are_n, G. Kurillo, P. Agarwal, K. Nahrstedt, and R. Bajcsy. Color-plus-depth level-of-detail in 3D tele-immersive video: A psychophysical approach. In Proc. of ACM Multimedia Conference (MM'11), pages 13{22, Scottsdale, Ariz., November 2011.
[24] Z. Yang, W. Wu, K. Nahrstedt, G. Kurillo, and R. Bajcsy. Viewcast: View dissemination and management for multi-party 3D tele-immersive environments. In Proc. of ACM Multimedia Conference (MM'07), pages 882{891, Augsburg, Bavaria, Germany, September 2007.
[25] L. Zhang, C. V_azquez, and S. Knorr. 3D-TV content creation: automatic 2D-to-3D video conversion. IEEE Transactions on Broadcasting, 57(2):372{383, 2011.
[26] Z. Zhang, C. Zhou, B. Xin, Y. Wang, and W. Gao. An interactive system of stereoscopic video conversion. In Proc. of ACM Multimedia Conference (MM'12), pages 149{158, Nara, Japan, October 2012.

The invention claimed is:

1. A method of processing 2D video images from a video stream for converting the 2D video images to 3D images, the method comprising:
providing a synthetic 3D reference database comprising computer generated 2D images and corresponding depth information for the 2D images;

submitting input video frames to the synthetic 3D reference database;

matching at least a portion of the input video frame with at least a portion of a 2D image in the synthetic 3D reference database;

selecting the corresponding depth information for that 2D image, wherein the depth information is a depth gradient; and applying the selected depth information to the matched input video frame portion to generate a 2D plus depth information frame portion;

identifying objects in the input video frame;

determining object masks for the identified objects; and estimating the depth information using the determined object masks and the matched input video frame, allowing depth discontinuities at object boundaries by modifying the Poisson equation there.

2. The method of claim 1, wherein the portions are blocks of n×n pixels.

3. The method of claim 1, wherein the method further comprises matching another portion of the input video frame with a portion of the 2D image or another 2D image in the synthetic 3D reference database.

4. The method of claim 1, wherein applying the selected depth information to the matched input video frame comprises applying the depth information of the matched portion of the 2D image to the respective matched portion of the matched input video frame.

5. The method of claim 4, wherein applying the selected depth information to the matched input video frame comprises mapping one or more corresponding pixels of the matched portion of the 2D image to the corresponding pixels of the matched portion of the input video frame.

6. The method of claim 1, comprising:
identifying a candidate 2D image for matching with the input video frame using GIST and colour information of the frames.

7. The method of claim 1, comprising:
reconstructing depth information using a Poisson reconstruction, according to:

$$\left(\frac{\partial^2}{\partial x^2} + \frac{\partial^2}{\partial y^2}\right)D = \nabla \cdot G,$$

where $G=(G_x, G_y)$ is the depth gradient, D is the depth information and $\nabla G$ is the divergence of G:

$$\nabla \cdot G = \left(\frac{\partial G_x}{\partial x} + \frac{\partial G_y}{\partial y}\right).$$

8. The method of claim 1, further comprising:
estimating the depth information using a Poisson reconstruction, formulated as Ax=b, where b=∇G, x=D, and A stores the coefficients of the Poisson equation, comprising:
disconnecting pixels from object boundaries by not allowing them to use an object boundary pixel as a valid neighbour, and for each pixel neighbouring a boundary pixel, setting the corresponding connection in A to 0 and updating its ∇G value accordingly so that pixels adjacent to object boundaries are treated similar to image boundary pixels.

9. The method of claim 8, wherein the Poisson reconstruction comprises first order and higher derivatives.

10. A method of processing 2D video images from a video stream for converting the 2D video images to 3D images, the method comprising:

providing a synthetic 3D reference database comprising computer generated 2D images and corresponding depth information for the 2D images;

submitting input video frames to the synthetic 3D reference database;

matching at least a portion of the input video frame with at least a portion of a 2D image in the synthetic 3D reference database;

selecting the corresponding depth information for that 2D image, wherein the depth information is a depth gradient;

applying the selected depth information to the matched input video frame portion to generate a 2D plus depth information frame portion;

reconstructing depth information using a Poisson reconstruction, according to:

$$\left(\frac{\partial^2}{\partial x^2} + \frac{\partial^2}{\partial y^2}\right)D = \nabla \cdot G,$$

where $G=(G_x, G_y)$ is the depth gradient, D is the depth information and $\nabla G$ is the divergence of G:

$$\nabla \cdot G = \left(\frac{\partial G_x}{\partial x} + \frac{\partial G_y}{\partial y}\right).$$

and
refining depth gradients using:

$$G_x = G_x \times \max\left(1 - e^{\left(1 - \frac{1}{\alpha |G_x|}\right)}, 0\right)$$

$$G_y = G_y \times \max\left(1 - e^{\left(1 - \frac{1}{\alpha |G_y|}\right)}, 0\right).$$

11. A method of processing 2D video images from a video stream for converting the 2D video images to 3D images, the method comprising:

providing a synthetic 3D reference database comprising computer generated 2D images and corresponding depth information for the 2D images;

submitting input video frames to the synthetic 3D reference database;

matching at least a portion of the input video frame with at least a portion of a 2D image in the synthetic 3D reference database;

selecting the corresponding depth information for that 2D image, wherein the depth information is a depth gradient;

applying the selected depth information to the matched input video frame portion to generate a 2D plus depth information frame portion;

reconstructing depth information using a Poisson reconstruction, according to:

$$\left(\frac{\partial^2}{\partial x^2} + \frac{\partial^2}{\partial y^2}\right)D = \nabla \cdot G,$$

where $G=(G_x, G_y)$ is the depth gradient, D is the depth information and $\nabla \cdot G$ is the divergence of G:

$$\nabla \cdot G = \left(\frac{\partial G_x}{\partial x} + \frac{\partial G_y}{\partial y}\right).$$

and
forcing the higher-order depth derivatives to be zero, comprising setting, in the continuous domain:

$$\left(\frac{\partial^4}{\partial x^4} + \frac{\partial^4}{\partial y^4}\right)D = 0.$$

12. The method of claim 1, further comprising generating a left stereo image and a right stereo image using the 2D image plus depth information frame.

13. A system to process 2D video images from a video stream for converting the 2D video images to 3D images, the system comprising:

a synthetic 3D reference database comprising computer generated 2D images and corresponding depth information for the 2D images;

a computer programmed to execute instructions comprising:

submitting input video frames to the synthetic 3D reference database;

matching at least a portion of an input video frame with at least a portion of a 2D image in the synthetic 3D reference database; selecting the corresponding depth information for that 2D image, wherein the depth information is a depth gradient;

applying the selected depth information to the matched input video frame portion to generate a 2D plus depth information frame portion;

identifying objects in the input video frame;

determining object masks for the identified objects; and estimating the depth information using the determined object masks and the matched input video frame, allowing depth discontinuities at object boundaries by modifying the Poisson equation there.

14. A non-transitory computer-readable medium programmed with instructions that, when executed, perform the method of claim 1.

* * * * *